(12) United States Patent
Nimmagadda et al.

(10) Patent No.: US 12,288,141 B2
(45) Date of Patent: Apr. 29, 2025

(54) MULTI-LEVEL CACHING FOR DYNAMIC DEEP LEARNING MODELS

(71) Applicant: Intel Corporation, Santa Clara, CA (US)

(72) Inventors: Yamini Nimmagadda, Portland, OR (US); Mustafa Cavus, Hillsboro, OR (US); Surya Siddharth Pemmaraju, Santa Clara, CA (US); Srinivasa Manohar Karlapalem, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 979 days.

(21) Appl. No.: 17/358,654

(22) Filed: Jun. 25, 2021

(65) Prior Publication Data

US 2021/0319369 A1    Oct. 14, 2021

(51) Int. Cl.
*G06N 20/00*    (2019.01)
*G06F 12/0811*  (2016.01)
*G06N 5/04*     (2023.01)

(52) U.S. Cl.
CPC ......... *G06N 20/00* (2019.01); *G06F 12/0811* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 2015/0379672 A1* | 12/2015 | Wang | G06T 15/80 345/423 |
| 2018/0165580 A1* | 6/2018 | Boyer | G06F 16/00 |
| 2018/0308202 A1* | 10/2018 | Appu | G06N 3/045 |
| 2020/0371937 A1* | 11/2020 | Chachad | G06F 12/0811 |
| 2020/0403064 A1* | 12/2020 | Baek | H01L 29/66545 |

* cited by examiner

*Primary Examiner* — Xuyang Xia
(74) *Attorney, Agent, or Firm* — Jordan IP Law, LLC

(57) ABSTRACT

Systems, apparatuses and methods provide technology for model generation with intermediate stage caching and re-use, including generating, via a model pipeline, a multi-level set of intermediate stages for a model, caching each of the set of intermediate stages, and responsive to a change in the model pipeline, regenerating an executable for the model using a first one of the cached intermediate stages to bypass regeneration of at least one of the intermediate stages. The multi-level set of intermediate stages can correspond to a hierarchy of processing stages in the model pipeline, where using the first one of the cached intermediate stages results in bypassing regeneration of a corresponding intermediate stage and of all intermediate stages preceding the corresponding intermediate stage in the hierarchy. Further, regenerating an executable for the model can include regenerating one or more intermediate stages following the corresponding intermediate stage in the hierarchy.

25 Claims, 7 Drawing Sheets

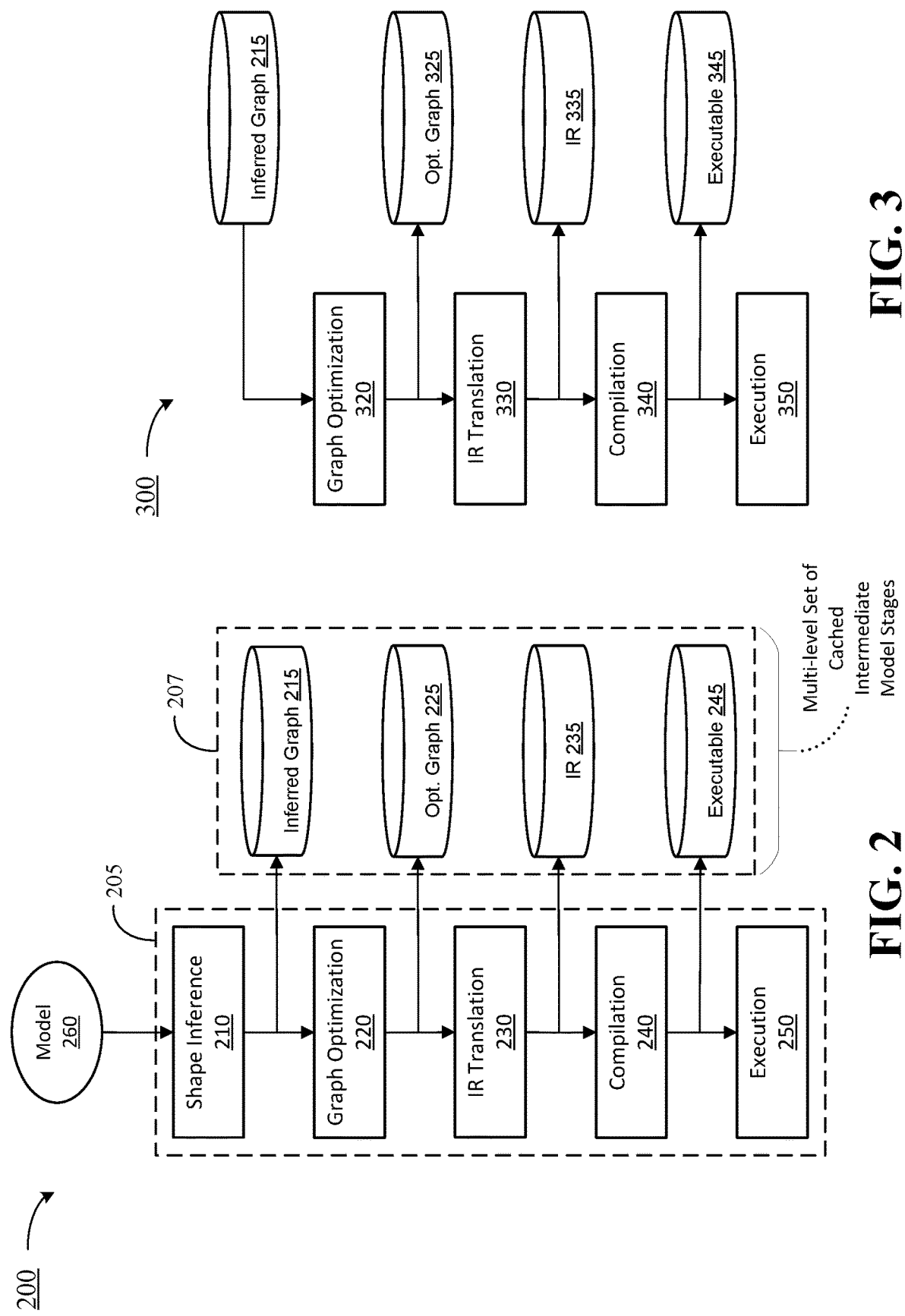

MULTI-LEVEL CACHING FOR DYNAMIC DEEP LEARNING MODELS

TECHNICAL FIELD

Embodiments generally relate to computing systems. More particularly, embodiments relate to framework integration for deep learning systems.

BACKGROUND

Many of the popular deep learning frameworks such as TENSORFLOW, PYTORCH, ONNX RUNTIME, PADDLEPADDLE and others can work with different hardware (HW) acceleration libraries to execute the deep learning models on the hardware platform. Each framework may support an extensible interface that would help to integrate with the HW specific libraries. This interface enables flexibility for the application developers to deploy models in different environments in the cloud and the edge and optimize the execution of artificial intelligence (AI) models by taking advantage of the compute capabilities of the platform. These frameworks can work with the execution providers (EPs), which have the interface to allocate specific nodes or sub-graphs in an AI model for execution by the EP library in supported hardware. The EP libraries that are pre-installed in the execution environment process and execute the subgraph of the model on the hardware. This architecture abstracts out the details of the hardware specific libraries that optimize the execution of deep neural networks across hardware platforms such as a central processing unit (CPU), graphics processing unit (GPU), field-programmable gate array (FPGA) or specialized application specific integrated circuit (ASIC).

A single framework today may be integrated with many other accelerated backend systems ("backends") for faster inferencing. For example, the ONNX Runtime package from MICROSOFT can be built with any combination of the execution provider along with a default CPU execution provider. The TENSORRT execution provider in the ONNX Runtime makes use of the TENSORRT Deep Learning inferencing engine from NVIDIA to accelerate the ONNX model in a family of GPUs. Similarly, the OPENVINO execution provider enables deep learning inference on CPUs, integrated GPUs and Vision Processing Units (VPUs) from INTEL. Framework integration of backends enables unsupported operators or a cluster of operators to be run on default runtimes and the rest of the supported graph to be run on an accelerated backend to obtain the best performance of the overall model on targeted hardware. If some operators in the model are not supported by an accelerated backend, then the corresponding deep learning framework will partition the graph and only send supported subgraphs to the accelerated backend, with the unsupported subgraphs falling back to the default backend from the framework.

Deep learning models can have dynamic input shapes, dynamic output shapes, or dynamic control flow operators. Dynamic models are becoming increasingly popular compared to static models because of their adaptability to serve data streams with different input resolutions, varying output values, and different data paths. However, executing dynamic models presents challenges when trying to utilize specialized hardware units, such as accelerators.

BRIEF DESCRIPTION OF THE DRAWINGS

The various advantages of the embodiments will become apparent to one skilled in the art by reading the following specification and appended claims, and by referencing the following drawings, in which:

FIG. 2 provides a diagram illustrating an example method of operating a deep learning model pipeline with intermediate stage caching according to one or more embodiments;

FIGS. 3-5 provide diagrams illustrating example methods of operating a deep learning model pipeline with intermediate stage re-use according to one or more embodiments;

DESCRIPTION OF EMBODIMENTS

An improved computing system as described herein provides multi-level caching technology to cache intermediate model representations at various stages of the model generation pipeline for dynamic models. The technology helps improve the overall performance of deep learning computing systems by significantly reducing latency of model executable regeneration made necessary by changes in optimizing components, runtime systems or hardware units.

Dynamic deep learning models are becoming increasingly popular because of their adaptable nature to various input types and sizes. Deep learning frameworks like TensorFlow and PyTorch allow dynamic model representation in various forms. The dynamism may be present in the batch dimension (Ex: 'N' in 'NCHW' data layout), channel dimension (Ex: 'C' in 'NCHW'), width or height (Ex: 'W' or 'H' in 'NCHW') for the input. NCHW (batch size, channel, height, width) is an example of a data layout used in deep learning systems. The dynamism may also be present in output shapes, data paths, control flow, intermediate node inputs/outputs etc.

Executing dynamic models on specialized accelerators presents a number of challenges. For example, given the limited programmability and resources on the accelerators, all the dynamic paths need to be resolved and a static model created before loading the model onto the accelerators. The shapes must be inferred for each layer and the data path must be selected in the case of dynamic control flow to create the static model. This static model must be optimized and compiled to an accelerator-compatible executable, which is then loaded and executed on the accelerator. For every new input, steps like shape inference, static model creation, optimization, and compilation need to be performed again.

Similarly, with changes to the runtime, or if the accelerator changes, all of these steps must be performed from scratch to create a new model executable suitable for the accelerator, resulting in a huge latency. This latency becomes a bottleneck and can nullify the inference performance gains provided by the accelerator.

By caching multiple levels of the intermediate model representations at various stages of the model generation pipeline, these cached stages can be re-used, in appropriate circumstances, during regeneration of a model, to bypass regenerating the cached stage. Using the cached stages as described herein results in decreasing the time and effort needed to regenerate a model after a change occurs and, thus, helps reduce the latency of model executable creation significantly.

Figure 1:
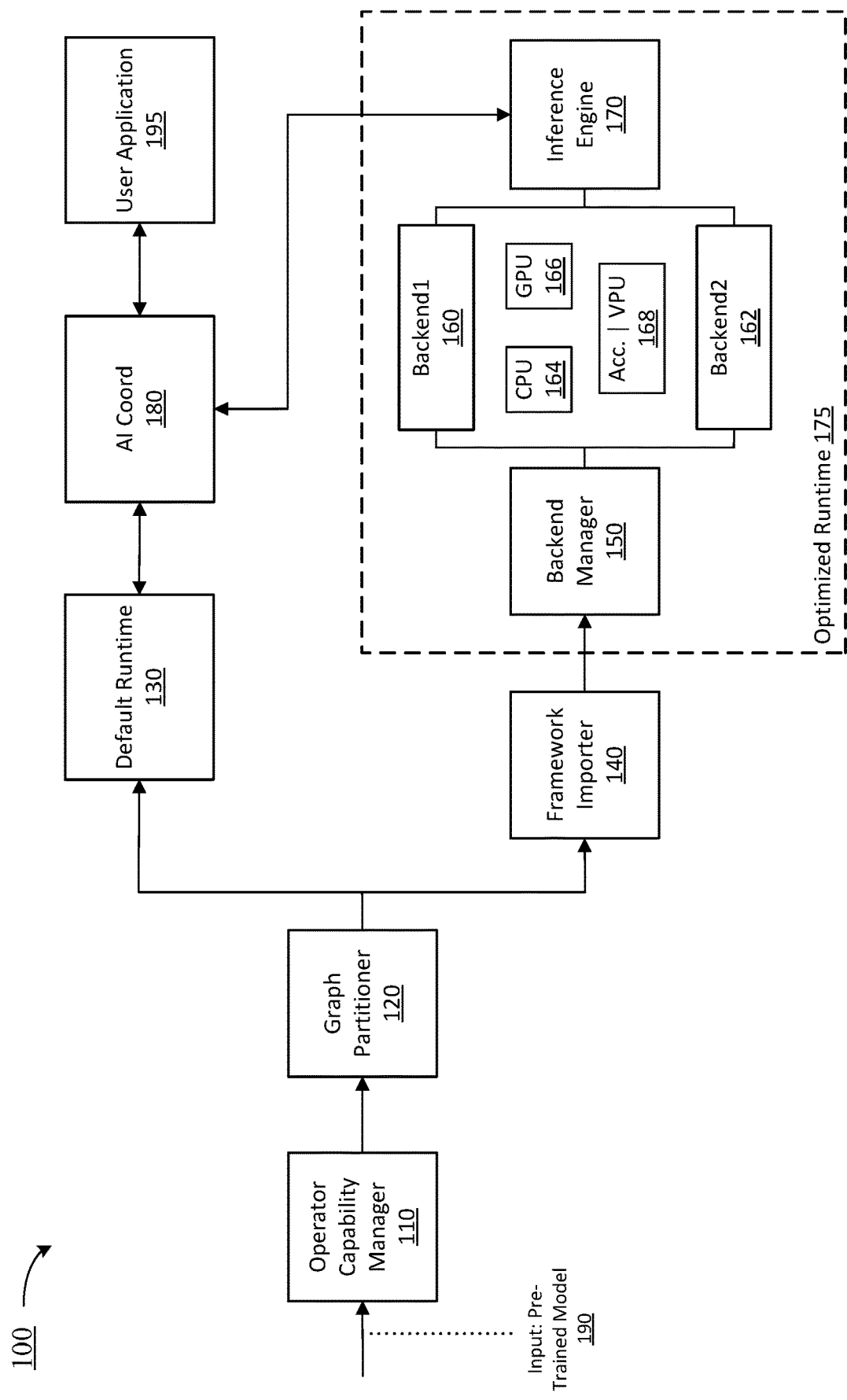
FIG. 1 provides a block diagram illustrating an example artificial intelligence (AI) framework integration system according to one or more embodiments.

FIG. 1 provides a block diagram illustrating an example of an artificial intelligence (AI) framework integration system 100 according to one or more embodiments, with reference to components and features described herein including but not limited to the figures and associated description. As shown in FIG. 1, the system 100 includes an operator capability manager 110, a graph partitioner 120, a default runtime 130, a framework importer 140, a backend manager 150, a first backend (backend1) 160, a second backend (backend2) 162, hardware execution units including a central processing unit (CPU) 164, a graphics processing unit (GPU) 166, and a hardware accelerator such as a vision processing unit (VPU) 168 (or another type of hardware AI accelerator), an inference engine 170 and an AI coordinator 180. It is understood that a variety of hardware execution units including a plurality of CPUs 164, GPUs 166 and/or VPUs 168 can be employed in the system 100. It is further understood that a variety of backends can be included in the system 100. Together, the backend manager 150, the first backend (backend1) 160, the second backend (backend2) 162, the hardware execution units (including one or more CPUs 164, one or more GPUs 166, and one or more VPUs 168) and the inference engine 170 form an optimized runtime 175.

The system 100 receives as input a pre-trained model 190. The pre-trained model 190 can be developed using an AI framework from a variety of sources, including, for example, TensorFlow, ONNX Runtime, PyTorch, etc. The pre-trained model 190 typically includes information and data regarding the model architecture (i.e., graph), including nodes, operators, weights and biases. Each node in a model graph represents an operation (e.g. mathematical, logical operator etc.) which is evaluated at runtime.

The operator capability manager 110 receives the input pre-trained model 190 and analyzes the operators in the model to determine which operators or nodes are supported, and under what conditions, by the available backend technology and hardware units. The analysis includes evaluating the operators, attributes, data types, and input nodes. The operator capability manager 110 marks the operators or nodes as supported or unsupported.

The graph partitioner 120 takes the pretrained model architecture, as marked by the operator capability manager 110, and partitions (e.g., divides) the model into subgraphs (i.e., groups of operators, or clusters). The subgraphs are allocated into two groups—supported subgraphs and unsupported subgraphs. Supported subgraphs are those subgraphs having operators or nodes that are supported by the available backend technology and hardware units under the conditions present in the model. Unsupported subgraphs are those subgraphs having operators or nodes that are not supported by the available backend technology and hardware units under the conditions present in the model. Supported subgraphs are designated for further processing to be run via the optimized runtime 175. Unsupported subgraphs are designated to be run via the default runtime 130. In some circumstances, the system can be "tuned" to enhance speed and efficiency in execution speed and/or memory usage by re-designating certain supported subgraphs to be executed via the default runtime.

The default runtime 130 is the basic runtime package provided for the AI framework corresponding to the input pre-trained model 190. The default runtime 130 executes on basic CPU hardware with no hardware accelerator support. The default runtime 130 typically includes a compiler to compile the unsupported subgraphs into executable code to be run on the basic CPU hardware.

The framework importer 140 receives supported subgraphs from the graph partitioner 120. The subgraphs are typically in a format specific to the framework used to generate the model. The framework importer 140 takes the subgraphs and generates an intermediate representation for these subgraphs, to be interpreted (i.e., read/parsed) by the optimized runtime 175. The intermediate representation produces a structured data set comprising the model architecture, metadata, weights and biases.

The backend manager 150 receives the intermediate representation of the supported model subgraphs and applies optimization techniques to optimize execution of the model using available backends and hardware options. For example, the backend manager 150 can select among available backends, e.g., the backend1 160 or the backend2 162. In some embodiments, the backend1 160 represents a basic backend that is optimized for a particular group of hardware units. For example, where the optimized runtime 175 utilizes the Open Visual Inference and Neural network Optimization (OpenVINO) runtime technology, the backend1 160 can be the OpenVINO backend. In some embodiments, the backend2 162 can be a backend such as VAD-M, which is optimized for machine vision tasks using a VPU such as the Intel® Myriad X VPU. The selected backend compiles (via a compiler) supported subgraphs into executable code, and performs optimization. The backend manager also selects among the available hardware units—the CPU 164, GPU 166 and/or VPU (or AI accelerator) 168. The backend manager 150 also dispatches data to the selected backend and schedules execution (inference) of the optimized model via the inference engine 170.

The inference engine 170 controls execution of the model code on the various hardware units that are employed for the particular model optimization. The inference engine 170 reads the input data and compiled graphs, instantiates inference on the selected hardware, and returns the output of the inference.

The AI coordinator 180 coordinates execution of AI workflow requests from a user application 195. The AI workflow requests are handled between the default runtime 130 (executing code generated from unsupported subgraphs) and the optimized runtime 175 (e.g., executing code generated from supported subgraphs). In one or more embodiments, the AI coordinator 180 is integrated within the default runtime 130. In one or more embodiments, the AI coordinator 180 is integrated within the optimized runtime 175.

Some or all components in the system 100 may be implemented using one or more of a central processing unit (CPU), a graphics processing unit (GPU), an artificial intelligence (AI) accelerator, a field programmable gate array (FPGA) accelerator, an application specific integrated circuit (ASIC), and/or via a processor with software, or in a combination of a processor with software and an FPGA or ASIC. More particularly, components of the system 100 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, ASIC, complementary metal oxide semiconductor (CMOS) or transistor-transistor logic (TTL) technology, or any combination thereof.

For example, computer program code to carry out operations by the system 100 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Multi-Level Caching for Dynamic Deep Learning Models

Preparing a deep learning model for inference execution (e.g., execution on a hardware unit such as an accelerator) requires several actions to generate an executable. These actions are typically carried out in a model generation pipeline, which is a software pipeline with various stages to transform the model from an input graph to an executable for a specific hardware unit (such as an accelerator). Turning now to FIG. 2, a diagram is provided illustrating an example method 200 of operating a deep learning model generation pipeline 205 with intermediate stage caching according to one or more embodiments, with reference to components and features described herein including but not limited to the figures and associated description. The method 200 and the pipeline 205 can generally be implemented in the system 100 (FIG. 1, already discussed). More particularly, the method 200 and/or components of and functions performed by the pipeline 205 can be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

For example, computer program code to carry out the method 200 and/or functions associated with the pipeline 205 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

As shown in the example of FIG. 2, the model generation pipeline 205 (which is a software pipeline) includes a shape inference process 210, a graph optimization process 220, an intermediate representation (IR) translation process 230, a compilation process 240 (e.g., a compiler), and an execution process 250. A multi-level set of cached intermediate model stages 207 includes cached stages from the processes of the pipeline 205. The multi-level set of cached intermediate model stages 207 can be stored in a common cache memory, or in different cache memories, which can be co-located or distributed in different cache locations. In embodiments, the cache memory or memories are incorporated within the pipeline 205; in some embodiments the cache memory or memories can be separate from the pipeline 205. In embodiments, the multi-level set of intermediate stages corresponds to a hierarchy of processing stages in the model pipeline 205.

Processing in the pipeline 205 starts with a deep learning model 260. The model 260 is a pre-trained model and typically includes information and data regarding the model architecture (i.e., graph), including nodes, operators, weights and biases. Each node in a model graph represents an operation (e.g. mathematical, logical operator etc.) which is evaluated at runtime. In embodiments the model 260 corresponds to the pre-trained model 190 (FIG. 1, already discussed). In embodiments, the model 260 corresponds to one or more subgraphs generated by the graph partitioner 120 (FIG. 1, already discussed). A first level of processing by pipeline 205 is to apply the shape inference process 210 to each layer of the model 260, which produces an output where the shapes of all the layers of the model 260 are inferred. The shape inference process 210 results in a shape inferred graph stage of the model (shape inferred graph is also referred to herein as inferred graph). The inferred graph stage is stored in an inferred graph cache 215.

The graph optimization process 220 is applied to the inferred graph stage of the model. The graph optimization process 220 performs high-level graph optimizations as target-independent optimizations. For example, the graph optimization process 220 can produce a result where some nodes are fused and some redundant nodes are removed. The output of the graph optimization process 220 is an optimized graph stage, which is stored in an optimized graph cache 225. Examples of a graph optimizer that can be used for the graph optimization process 220 include the Ngraph graph optimizer, OpenVINO Model Optimizer, Neural Network Virtual Machine (NNVM), TensorFlow XLA High Level Operations (HLO), etc.

The intermediate representation (IR) translation process 230 is applied to the optimized graph stage. The IR translation process 230 generates an intermediate representation (IR) stage of the model, which is specific for the particular runtime being used. The IR stage is stored in an IR cache 235. After the IR stage is generated by the IR translation process 230, the compilation process 240 (e.g., a compiler) is applied to the IR stage, which compiles the IR stage into an executable (i.e. executable stage, also known as a compiled blob). The compilation process (compiler) 240 is compatible with the particular hardware device (e.g., accelerator) to be used for execution. The executable that results from the compilation process 240 is typically specific to the particular hardware device (e.g., accelerator) to be used for execution. The resulting executable (executable stage) is stored in an executable cache 245.

Once the executable stage has been generated, the executable is loaded on the hardware device/accelerator and is executed (inference) by execution process 250. In some embodiments, the execution is coordinated by an inference engine, such as inference engine 170 (FIG. 1, already discussed). As a result of the process of generating an executable for a model using the pipeline 205, a multi-level set of intermediate model stages is generated. Each stage is stored in the respective cache for that stage within the multi-level cache set 207. In embodiments, the respective cached stage can be used as input for the next stage during the model generation process. It will be understood that the processes and stages described herein with respect to the pipeline 205 are exemplary and that more, fewer, or other processing, functions and stages can be included in a model generation pipeline (such as pipeline 205).

A change in one or more of the processes of the pipeline 205 can result in the need to regenerate the executable for the model. Changes in the pipeline processing can include a change in the compilation process required when there is a change in the hardware executing device, because a change in the hardware executing device requires a change in the executable to be run on the hardware device. Responsive to a change in the pipeline processing, one of the cached multi-level stages can be re-used, thereby bypassing regeneration of the corresponding stage of the model. The stage to be re-used can depend upon which process (or processes) in the pipeline are changed.

FIG. 3 provides a diagram illustrating an example process (or method) 300 of operating a deep learning model pipeline with intermediate stage re-use according to one or more embodiments, with reference to components and features described herein including but not limited to the figures and associated description. The method 300 can generally be implemented in the system 100 (FIG. 1, already discussed) and/or via components of the pipeline 205 (FIG. 2, already discussed). More particularly, the method 300 can be implemented as one or more modules in a set of logic instructions stored in a non-transitory machine- or computer-readable storage medium such as such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

For example, computer program code to carry out operations shown in the method 300 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In the example illustrated in FIG. 3, the model executable previously generated (e.g., as described with reference to FIG. 2) is required to be regenerated as a result in a change involving the graph optimization process 220 of the model generation pipeline 205. For example, an update to the graph optimization process could result in the need to regenerate the model executable. As another example, a change in the graph optimization process (e.g., changing from the NGraph graph optimizer to the OpenVINO Model Optimizer) could result in the need to regenerate the model executable. Turning to FIG. 3, with a change or update to the graph optimization process, the pipeline employs a new graph optimization process 320 (replacing graph optimization process 220 in FIG. 2). Thus, in this example, to regenerate the model, the graph optimization process 320 needs to be run, along with the remaining processes in the pipeline 205 that are performed after the graph optimization process.

However, if there is no change to the input shape, the previously generated inferred graph stage can be re-used. Thus, as illustrated in FIG. 3, the cached inferred graph stage is obtained from the inferred graph cache 215 of the pipeline 205, where the inferred graph stage was generated and cached as part of the prior model generation (such as described with reference to FIG. 2). The inferred graph stage from the inferred graph cache 215 is used as input to the graph optimization process 320 of the model generation pipeline. Similar to the graph optimization process 220, the graph optimization process 320 performs high-level graph optimizations as target-independent optimizations which can produce a result where some nodes are fused and some redundant nodes are removed. The output of the graph optimization process 320 is an optimized graph stage. In embodiments, the optimized graph stage is stored in an optimized graph cache 325.

For the next level of processing, the pipeline 205 applies an intermediate representation (IR) translation process 330 to the optimized graph stage. The IR translation process 330 generates an intermediate representation (IR) stage of the model, which is specific for the particular runtime being used. The IR stage is stored in an IR cache 335. In embodiments the IR translation process 330 corresponds to the IR translation process 230 (FIG. 2, already discussed). After the IR stage is generated by the IR translation process 330, the next level of the pipeline 205 applies a compilation process 340 to the IR stage, which compiles the IR stage into an executable (i.e., executable stage). The executable is compatible with the particular hardware device (e.g., accelerator) to be used for execution. In embodiments the compilation process 340 corresponds to the compilation process 240 (FIG. 2, already discussed). The resulting executable (executable stage) is stored in an executable cache 345. Once the executable stage has been generated, the executable is loaded on the hardware device/accelerator and is executed (inference) by the execution process 350—which, in embodiments, corresponds to the execution process 250 (FIG. 2, already discussed). As a result, the executable model has been regenerated—while bypassing the need to perform the shape inference process 210 and the need to regenerate the inferred graph stage. Thus, in this example, where the multi-level set of intermediate stages corresponds to a hierarchy of processing stages in the model pipeline, using one of the cached intermediate stages (here, the inferred graph cache 215) results in bypassing regeneration of a corresponding intermediate stage (the inferred graph stage). Further, in this example, regenerating an executable for the model comprises regenerating one or more intermediate stages (here, the optimized graph stage, the IR stage, and the executable stage) following the corresponding intermediate stage (the inferred graph stage) in the hierarchy.

Figure 4:
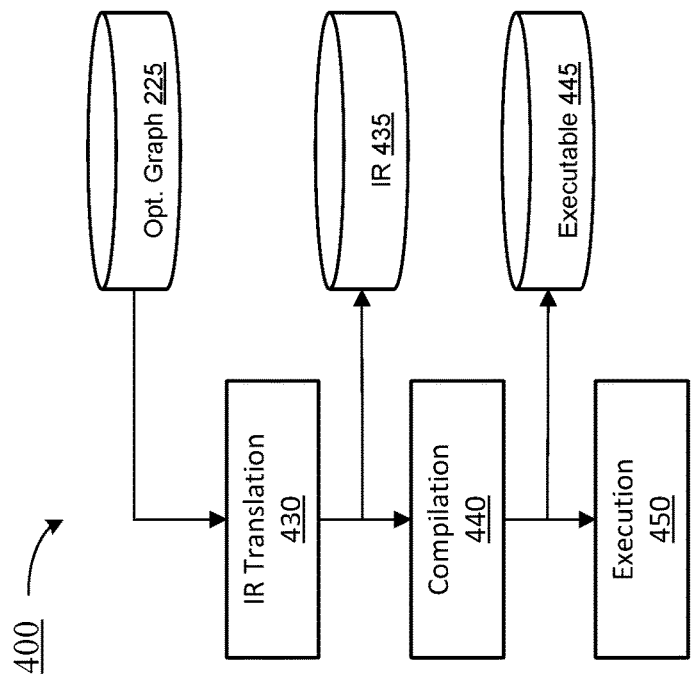

FIG. 4 provides a diagram illustrating an example process (or method) 400 of operating a deep learning model pipeline with intermediate stage re-use according to one or more embodiments, with reference to components and features described herein including but not limited to the figures and associated description. The method 400 can generally be implemented in the system 100 (FIG. 1, already discussed) and/or via components of the pipeline 205 (FIG. 2, already discussed). More particularly, the method 400 can be implemented as one or more modules in a set of logic instructions stored in a non-transitory machine- or computer-readable storage medium such as such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

For example, computer program code to carry out operations shown in the method 400 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In the example illustrated in FIG. 4, the model executable previously generated (e.g., as described with reference to FIG. 2) is required to be regenerated as a result in a change involving the intermediate representation (IR) translation process 230 of the model generation pipeline 205. For example, an update to the IR translation process may be provided as part of a revised version of the runtime. As another example, a change in the runtime (e.g., changing from another runtime to OpenVINO) can result in the need to regenerate the model executable. Turning to FIG. 4, with a change or update to the IR translation process, the pipeline employs a new IR translation process 430 (replacing IR translation process 230 in FIG. 2). Thus, in this example, to regenerate the model, the IR translation process 430 needs to be run, along with the remaining processes in the pipeline 205 that are performed after the IR translation process.

However, if there is no change to the prior processing stages, the previously generated optimized graph stage can be re-used. Thus, as illustrated in FIG. 4, the cached optimized graph stage is obtained from the optimized graph cache 225 of the pipeline 205, where the optimized graph stage was generated and cached as part of the prior model generation (such as described with reference to FIG. 2). The optimized graph stage from the optimized graph cache 225 is used as input to the IR translation process 430 of the model generation pipeline. As the optimized graph cache 225 was originally generated based on the inferred graph (FIG. 2, already discussed), the inferred graph cache 215 is not required here to regenerate the model. The output of the IR translation process 430 is an IR stage. In embodiments, the IR stage is stored in an IR cache 435.

For the next level of processing, the pipeline 205 applies a compilation process 440 to the IR stage, which compiles the IR stage into an executable (i.e., executable stage). The executable is compatible with the particular hardware device (e.g., accelerator) to be used for execution. In embodiments the compilation process 440 corresponds to the compilation process 240 (FIG. 2, already discussed). The resulting executable (executable stage) is stored in an executable cache 445. Once the executable stage has been generated, the executable is loaded on the hardware device/accelerator and is executed (inference) by the execution process 450—which, in embodiments, corresponds to the execution process 250 (FIG. 2, already discussed). As a result, the executable model has been regenerated—while bypassing the need to: perform the shape inference process 210 and the graph optimization process 220, and the need to regenerate the inferred graph stage and the optimized graph stage. Thus, in this example, where the multi-level set of intermediate stages corresponds to a hierarchy of processing stages in the model pipeline, using one of the cached intermediate stages (here, the optimized graph cache 225) results in bypassing regeneration of a corresponding intermediate stage (the optimized graph stage) and of all intermediate stages preceding the corresponding intermediate stage in the hierarchy (the inferred graph stage). Further, in this example regenerating an executable for the model comprises regenerating one or more intermediate stages (here, the IR stage and the executable stage) following the corresponding intermediate stage (the optimized graph stage) in the hierarchy.

Figure 5:
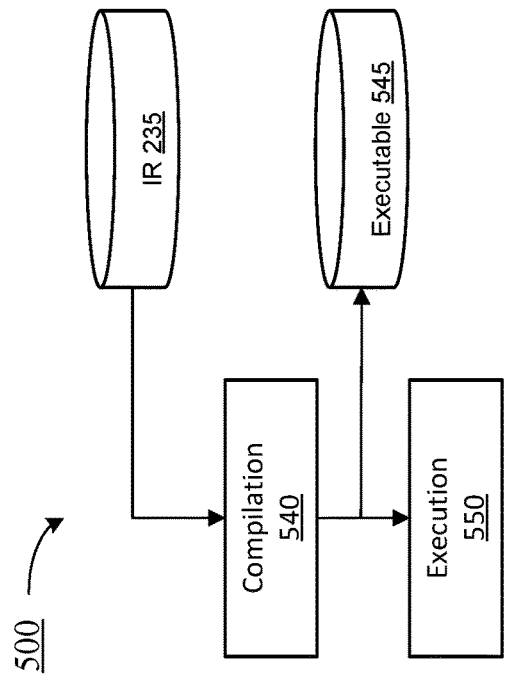

FIG. 5 provides a diagram illustrating an example process (or method) 500 of operating a deep learning model pipeline with intermediate stage re-use according to one or more embodiments, with reference to components and features described herein including but not limited to the figures and associated description. The method 500 can generally be implemented in the system 100 (FIG. 1, already discussed) and/or via components of the pipeline 205 (FIG. 2, already discussed). More particularly, the method 500 can be implemented as one or more modules in a set of logic instructions stored in a non-transitory machine- or computer-readable storage medium such as such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

For example, computer program code to carry out operations shown in the method 500 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In the example illustrated in FIG. 5, the model executable previously generated (e.g., as described with reference to FIG. 2) is required to be regenerated as a result in a change involving the compilation process 240 (e.g., compiler) of the model generation pipeline 205. For example, an update to the compiler may be provided. As another example, a change in the hardware device (e.g., selection of a new or different hardware device, such as an accelerator) to be used for execution can result in the need to regenerate the model executable, because a different compilation process (compiler) is needed to generate an executable for the newly-selected hardware device. Turning to FIG. 5, with a change or update to the compilation process, or to the hardware device to be used for execution, the pipeline employs a compilation process 540 (replacing the compilation process

240 in FIG. 2). Thus, in this example, to regenerate the model, the compilation process 540 needs to be run, which provides the new model executable.

However, if there is no change to the prior processing stages, the previously generated IR stage can be re-used. Thus, as illustrated in FIG. 5, the cached IR stage is obtained from the IR cache 235 of the pipeline 205, where the IR stage was generated and cached as part of the prior model generation (such as described with reference to FIG. 2). The IR stage from the IR cache 235 is used as input to the compilation process 540 of the model generation pipeline. As the IR cache 235 was originally generated based on the optimized graph (FIG. 2, already discussed), neither of the optimized graph cache 225 or the inferred graph cache 215 are required here to regenerate the model. The output of the compilation process 540 is an executable (executable stage). The executable is compatible with the particular hardware device (e.g., accelerator) to be used for execution. The resulting executable (executable stage) is stored in an executable cache 545. Once the executable stage has been generated, the executable is loaded on the hardware device/accelerator and is executed (inference) by the execution process 550—which, in embodiments, corresponds to the execution process 250 (FIG. 2, already discussed). As a result, the executable model has been regenerated—while bypassing the need to: perform the shape inference process 210, the graph optimization process 220 and the IR translation process 230, and the need to regenerate the inferred graph stage, the optimized graph stage and the IR stage. Thus, in this example, where the multi-level set of intermediate stages corresponds to a hierarchy of processing stages in the model pipeline, using one of the cached intermediate stages (here, the IR cache 235) results in bypassing regeneration of a corresponding intermediate stage (the IR stage) and of all intermediate stages preceding the corresponding intermediate stage in the hierarchy (the inferred graph stage and the optimized graph stage). Further, in this example regenerating an executable for the model comprises regenerating one or more intermediate stages (here, the executable stage) following the corresponding intermediate stage (the IR stage) in the hierarchy.

In some embodiments, the pipeline stages that are regenerated and cached (e.g., optimized graph cache 325, IR cache 335, and executable cache 345 (FIG. 3, already discussed), IR cache 435 and executable cache 445 (FIG. 3, already discussed), and/or executable cache 545 (FIG. 5, already discussed), can be cached in addition to the prior-cached versions of the respective stage. In embodiments, the pipeline stages that are regenerated and cached can replace the prior-cached versions of the respective stage.

Figure 6:
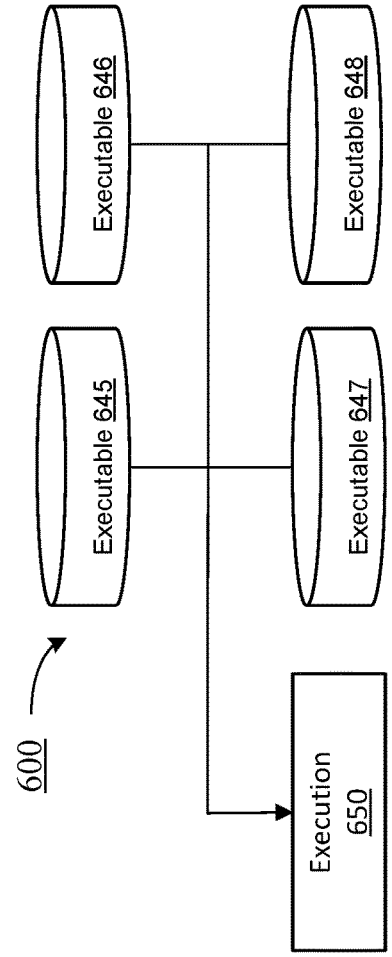
FIG. 6 provides a diagram illustrating an example method of operating a deep learning model pipeline with executable stage re-use according to one or more embodiments.

FIG. 6 provides a diagram illustrating an example process (method) 600 of operating a deep learning model pipeline with executable stage re-use according to one or more embodiments, with reference to components and features described herein including but not limited to the figures and associated description. The method 600 can generally be implemented in the system 100 (FIG. 1, already discussed) and/or via components of the pipeline 205 (FIG. 2, already discussed). More particularly, the method 600 can be implemented as one or more modules in a set of logic instructions stored in a non-transitory machine- or computer-readable storage medium such as such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

For example, computer program code to carry out operations shown in the method 600 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In the example illustrated in FIG. 6, the pipeline 205 includes a set of executable caches 645, 646, 647 and 648. Each of the executable caches 645, 646, 647 and 648 stores an executable for the model as previously generated or regenerated (e.g., as described herein with reference to FIG. 2, 3, 4, or 5). For example, each of the executable caches 645, 646, 647 and 648 can correspond to an executable generated for a different hardware device to be used for execution. As illustrated in FIG. 6, each of the executables cached in executable caches 645, 646, 647 and 648 is available for selection as an executable for a particular hardware device (e.g., a hardware device that is available or selected from a group of available hardware devices). Once a hardware device is selected or otherwise determined to be available, the executable corresponding to that hardware device is selected and retrieved from the corresponding executable cache, then the executable is loaded on the hardware device/accelerator and is executed (inference) by the execution process 650—which, in embodiments, corresponds to the execution process 250 (FIG. 2, already discussed). As a result, the executable model as generated for different hardware devices can be re-used as needed for the particular selected or available device, while bypassing the need to perform all of the pipeline processes for model generation. While four executable caches are shown in the example of FIG. 6, a greater or lesser number of execution caches can be used in various embodiments.

Caching models at various intermediate stages can result in an increase of memory consumption. Some embodiments can use edge devices having limited memory. These memory limitations can provide a constraint on the number of cached model stages that the device can maintain. In such cases, a most frequently used (MFU) cache algorithm can be used to determine which cached stages should be stored on the device with limited memory, and which cached stages should be stored in other cache levels. The MFU cache algorithm can track the respective usage of the cached stages to determine which cached stages are most frequently used. For example, in some embodiments the MFU cache algorithm maintains a counter to keep track of how often the cached models at each stage are accessed. Based on the tracking, the model stages from most frequently used stages are cached in lower level caches, while intermediate model stages from other stages can be cached in higher levels. By caching only the most frequently used cached stages with the local device, the memory consumption on edge devices with limited memory can be reduced, while providing local access to the stages that are most likely to be needed.

Figure 7A:
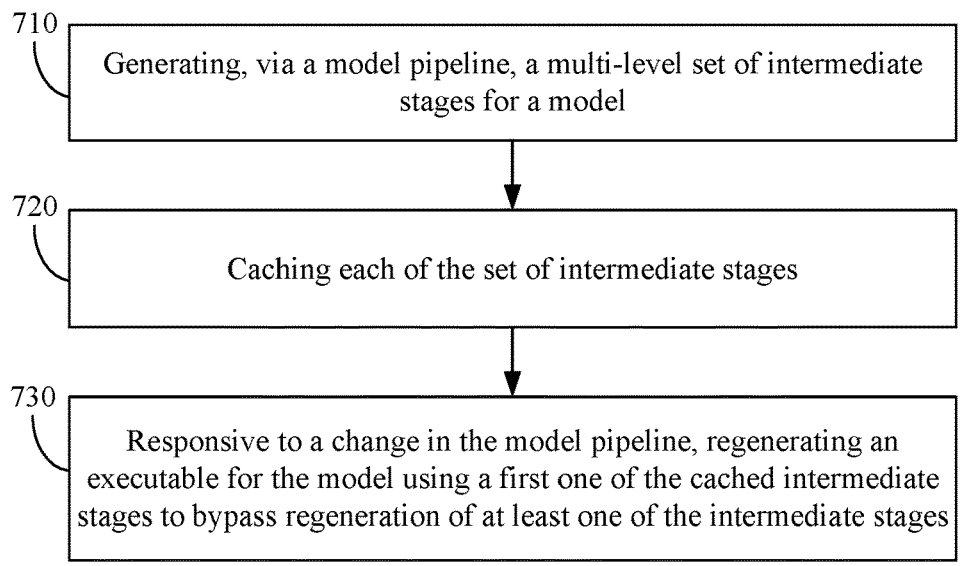
FIG. 7A provides a flow chart illustrating an example method of operating a deep learning model pipeline with intermediate stage re-use according to one or more embodiments.

FIG. 7A provides a flow chart illustrating an example method 700 of operating a deep learning model pipeline with intermediate stage re-use according to one or more embodiments, with reference to components and features described herein including but not limited to the figures and associated description. The method 700 can generally be implemented in the system 100 (FIG. 1, already discussed) and/or via components of the pipeline 205 (FIG. 2, already discussed). More particularly, the method 700 can be implemented as one or more modules in a set of logic instructions stored in a non-transitory machine- or computer-readable storage medium such as such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

For example, computer program code to carry out operations shown in the method 700 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 710 provides for generating, via a model pipeline, a multi-level set of intermediate stages for a model. Illustrated processing block 720 provides for caching each of the set of intermediate stages. Illustrated processing block 730 provides for, responsive to a change in the model pipeline, regenerating an executable for the model using a first one of the cached intermediate stages to bypass regeneration of at least one of the intermediate stages.

Figure 7B:
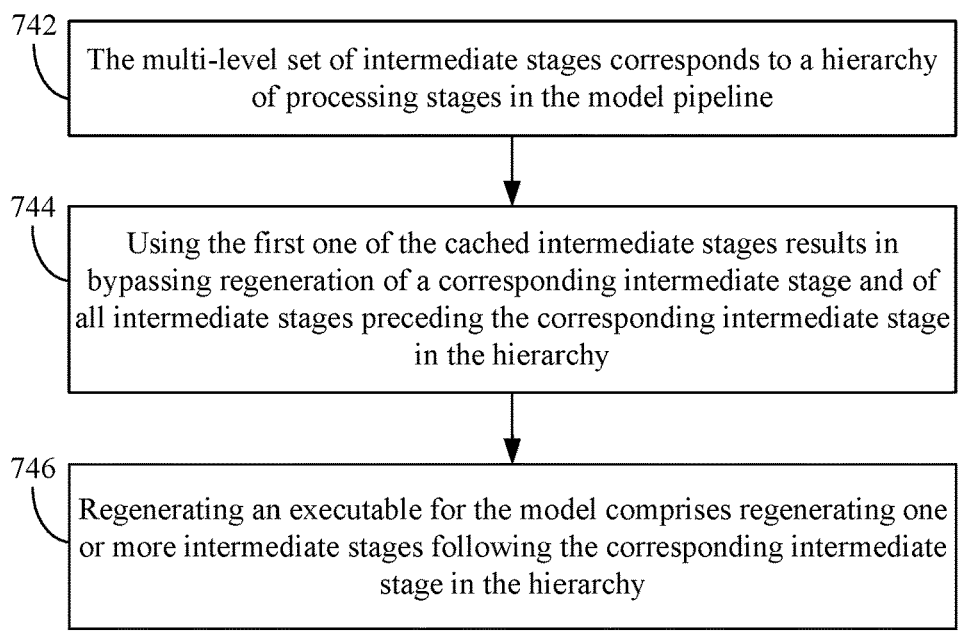
FIG. 7B provides a flow chart illustrating an example method of operating a deep learning model pipeline with intermediate stage re-use according to one or more embodiments.

FIG. 7B provides a flow chart illustrating an example method 740 of operating a deep learning model pipeline with intermediate stage re-use according to one or more embodiments, with reference to components and features described herein including but not limited to the figures and associated description. The method 740 can generally be implemented in the system 100 (FIG. 1, already discussed) and/or via components of the pipeline 205 (FIG. 2, already discussed). All or portions of the method 740 can be substituted for all or a portion of illustrated processing block 730 (FIG. 7A, already discussed). More particularly, the method 740 can be implemented as one or more modules in a set of logic instructions stored in a non-transitory machine- or computer-readable storage medium such as such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

For example, computer program code to carry out operations shown in the method 740 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 742 provides wherein the multi-level set of intermediate stages corresponds to a hierarchy of processing stages in the model pipeline. Illustrated processing block 744 provides wherein using the first one of the cached intermediate stages results in bypassing regeneration of a corresponding intermediate stage and of all intermediate stages preceding the corresponding intermediate stage in the hierarchy. Illustrated processing block 746 provides wherein regenerating an executable for the model comprises regenerating one or more intermediate stages following the corresponding intermediate stage in the hierarchy.

Figure 8:
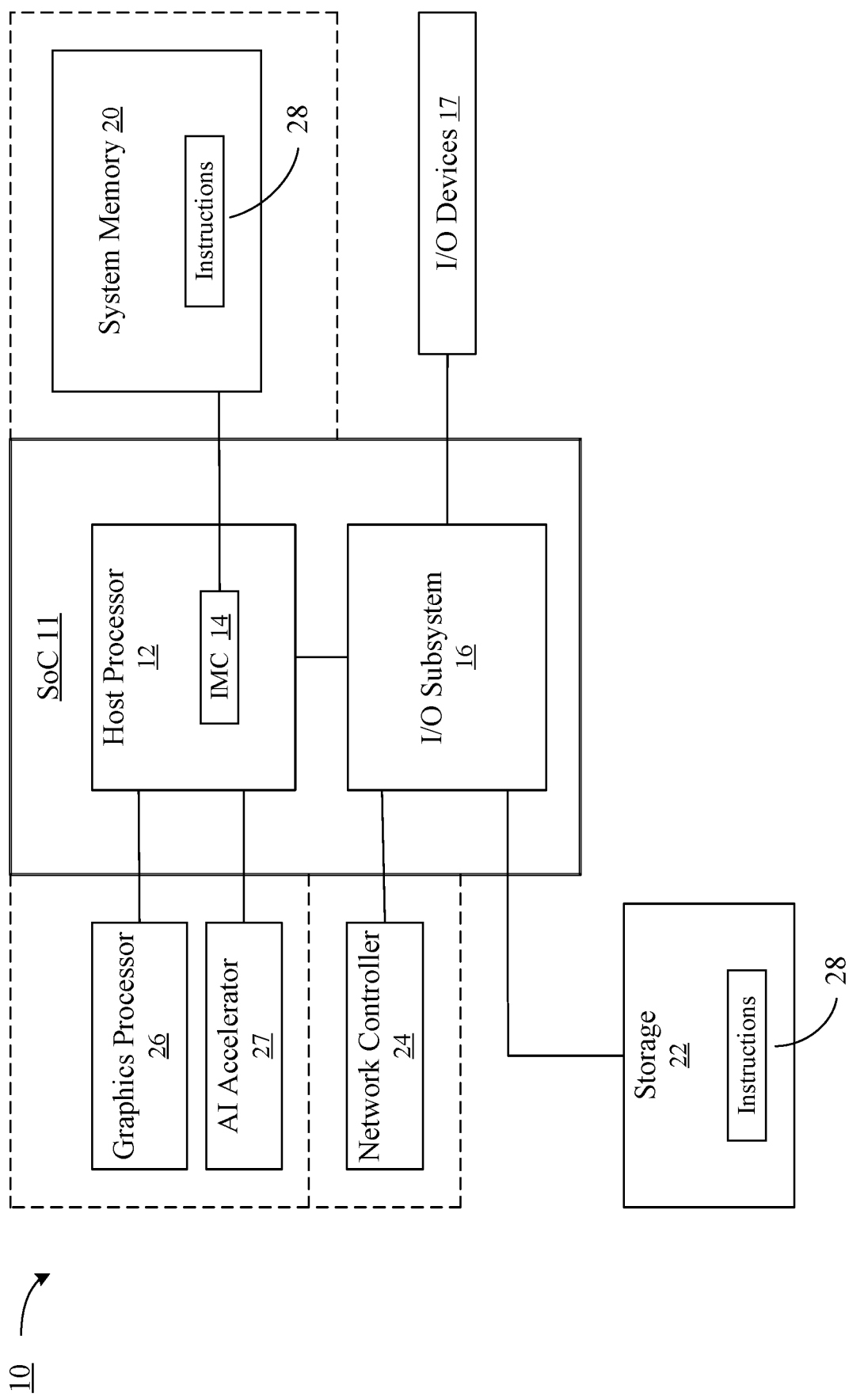
FIG. 8 is a block diagram illustrating an example computing system for AI framework integration according to one or more embodiments.

FIG. 8 shows a block diagram illustrating an example computing system 10 for model generation with intermediate stage caching and re-use according to one or more embodiments, with reference to components and features described herein including but not limited to the figures and associated description. The system 10 can generally be part of an electronic device/platform having computing and/or communications functionality (e.g., server, cloud infrastructure controller, database controller, notebook computer, desktop computer, personal digital assistant/PDA, tablet computer, convertible tablet, smart phone, etc.), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 10 can include a host processor 12 (e.g., central processing unit/CPU) having an integrated memory controller (IMC) 14 that can be coupled to system memory 20. The host processor 12 can include any type of processing device, such as, e.g., microcontroller, microprocessor, RISC processor, ASIC, etc., along with associated processing modules or circuitry. The system memory 20 can include any non-transitory machine- or computer-readable storage medium such as RAM, ROM, PROM, EEPROM, firmware, flash memory, etc., configurable logic such as, for example, PLAs, FPGAs, CPLDs, fixed-functionality hardware logic using circuit technology such as, for example, ASIC, CMOS or TTL technology, or any combination thereof suitable for storing instructions 28.

The system 10 can also include an input/output (I/O) subsystem 16. The I/O subsystem 16 can communicate with for example, one or more input/output (I/O) devices 17, a network controller 24 (e.g., wired and/or wireless NIC), and storage 22. The storage 22 can be comprised of any appropriate non-transitory machine- or computer-readable memory type (e.g., flash memory, DRAM, SRAM (static random access memory), solid state drive (SSD), hard disk drive (HDD), optical disk, etc.). The storage 22 can include mass storage. In some embodiments, the host processor 12 and/or the I/O subsystem 16 can communicate with the storage 22 (all or portions thereof) via a network controller 24. In some embodiments, the system 10 can also include a graphics processor 26 (e.g., a graphics processing unit/GPU) and an AI accelerator 27. In an embodiment, the system 10 can also include a vision processing unit (VPU), not shown.

The host processor 12 and the I/O subsystem 16 can be implemented together on a semiconductor die as a system on chip (SoC) 11, shown encased in a solid line. The SoC 11 can therefore operate as a computing apparatus for model generation with intermediate stage caching and re-use. In some embodiments, the SoC 11 can also include one or more of the system memory 20, the network controller 24, and/or the graphics processor 26 (shown encased in dotted lines). In some embodiments, the SoC 11 can also include other components of the system 10.

The host processor 12 and/or the I/O subsystem 16 can execute program instructions 28 retrieved from the system memory 20 and/or the storage 22 to perform one or more aspects of process 200, process 300, process 400, process 500, process 600, process 700, and/or process 740. The system 10 can implement one or more aspects of system 100, pipeline 205, and/or cached stages 207 as described herein with reference to FIGS. 1 and 2. The system 10 is therefore considered to be performance-enhanced at least to the extent that the technology provides the ability to re-use one of a set of cached multi-level stages in regenerating an executable model, thereby bypassing regeneration of the corresponding stage of the model.

Computer program code to carry out the processes described above can be written in any combination of one or more programming languages, including an object-oriented programming language such as JAVA, JAVASCRIPT, PYTHON, SMALLTALK, C++ or the like and/or conventional procedural programming languages, such as the "C" programming language or similar programming languages, and implemented as program instructions 28. Additionally, program instructions 28 can include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, microprocessor, etc.).

I/O devices 17 can include one or more of input devices, such as a touch-screen, keyboard, mouse, cursor-control device, touch-screen, microphone, digital camera, video recorder, camcorder, biometric scanners and/or sensors; input devices can be used to enter information and interact with system 10 and/or with other devices. The I/O devices 17 can also include one or more of output devices, such as a display (e.g., touch screen, liquid crystal display/LCD, light emitting diode/LED display, plasma panels, etc.), speakers and/or other visual or audio output devices. The input and/or output devices can be used, e.g., to provide a user interface.

Figure 9:
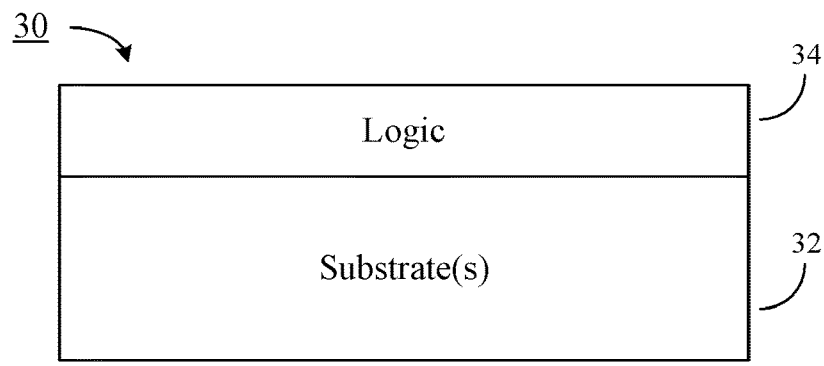
FIG. 9 is a block diagram illustrating an example semiconductor apparatus according to one or more embodiments.

FIG. 9 shows a block diagram illustrating an example semiconductor apparatus 30 for model generation with intermediate stage caching and re-use according to one or more embodiments, with reference to components and features described herein including but not limited to the figures and associated description. The semiconductor apparatus 30 can be implemented, e.g., as a chip, die, or other semiconductor package. The semiconductor apparatus 30 can include one or more substrates 32 comprised of, e.g., silicon, sapphire, gallium arsenide, etc. The semiconductor apparatus 30 can also include logic 34 comprised of, e.g., transistor array(s) and other integrated circuit (IC) components) coupled to the substrate(s) 32. The logic 34 can be implemented at least partly in configurable logic or fixed-functionality logic hardware. The logic 34 can implement the system on chip (SoC) 11 described above with reference to FIG. 8. The logic 34 can implement one or more aspects of the processes described above, including process 200, process 300, process 400, process 500, process 600, process 700, and/or process 740. The logic 34 can implement one or more aspects of system 100, pipeline 205, and/or cached stages 207 as described herein with reference to FIGS. 1 and 2. The apparatus 30 is therefore considered to be performance-enhanced at least to the extent that the technology provides the ability to re-use one of a set of cached multi-level stages in regenerating an executable model, thereby bypassing regeneration of the corresponding stage of the model.

The semiconductor apparatus 30 can be constructed using any appropriate semiconductor manufacturing processes or techniques. For example, the logic 34 can include transistor channel regions that are positioned (e.g., embedded) within the substrate(s) 32. Thus, the interface between the logic 34 and the substrate(s) 32 can not be an abrupt junction. The logic 34 can also be considered to include an epitaxial layer that is grown on an initial wafer of the substrate(s) 32.

Figure 10:
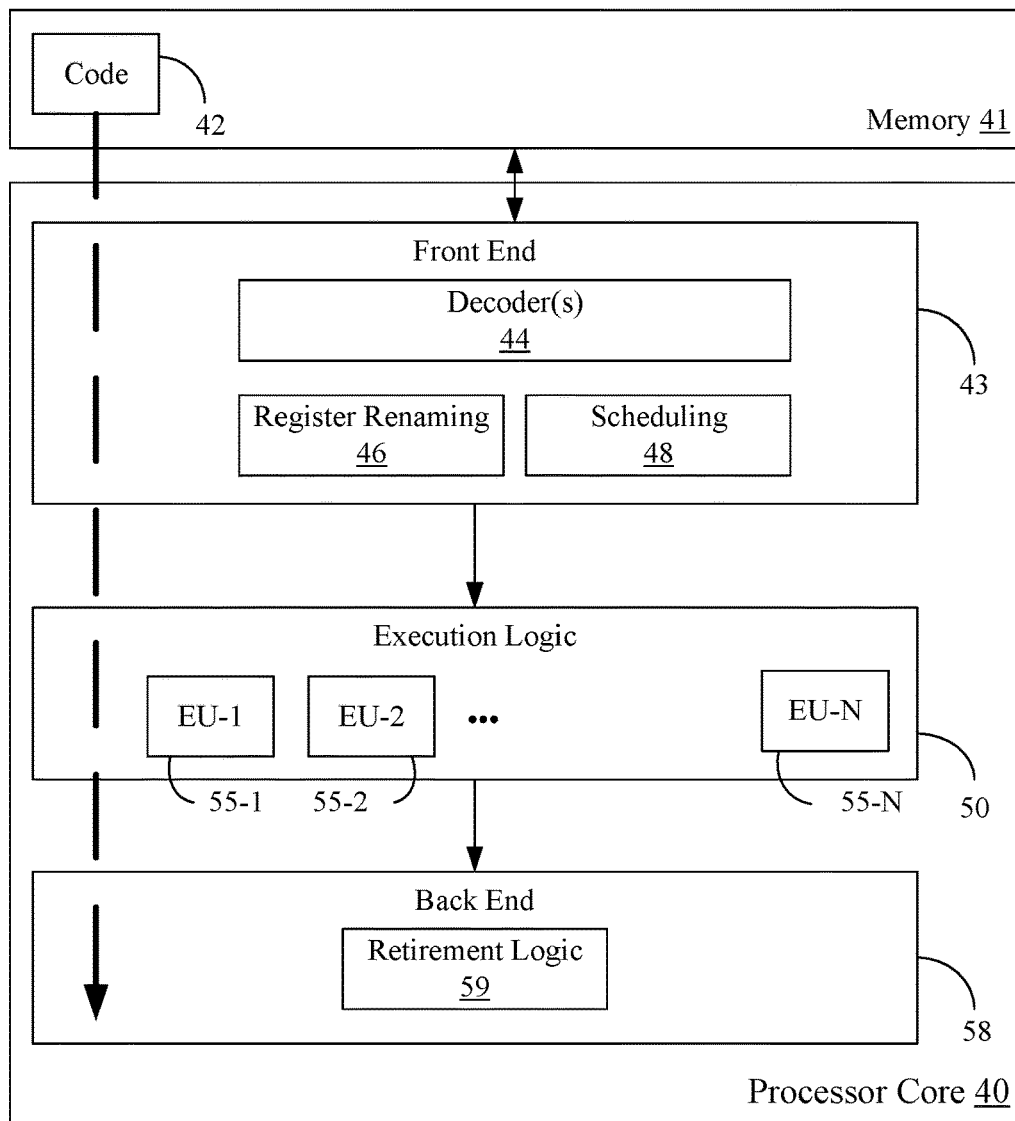
FIG. 10 is a block diagram illustrating an example processor according to one or more embodiments.

FIG. 10 is a block diagram illustrating an example processor core 40 according to one or more embodiments, with reference to components and features described herein including but not limited to the figures and associated description. The processor core 40 can be the core for any type of processor, such as a micro-processor, an embedded processor, a digital signal processor (DSP), a network processor, a graphics processing unit (GPU), or other device to execute code. Although only one processor core 40 is illustrated in FIG. 10, a processing element can alternatively include more than one of the processor core 40 illustrated in FIG. 10. The processor core 40 can be a single-threaded core or, for at least one embodiment, the processor core 40 can be multithreaded in that it can include more than one hardware thread context (or "logical processor") per core.

FIG. 10 also illustrates a memory 41 coupled to the processor core 40. The memory 41 can be any of a wide variety of memories (including various layers of memory hierarchy) as are known or otherwise available to those of skill in the art. The memory 41 can include one or more code 42 instruction(s) to be executed by the processor core 40. The code 42 can implement one or more aspects of the process 200, process 300, process 400, process 500, process 600, process 700, and/or process 740 described above. The processor core 40 can implement one or more aspects of system 100, pipeline 205, and/or cached stages 207 as described herein with reference to FIGS. 1 and 2. The processor core 40 can follow a program sequence of instructions indicated by the code 42. Each instruction can enter a front end portion 43 and be processed by one or more decoders 44. The decoder 44 can generate as its output a micro operation such as a fixed width micro operation in a predefined format, or can generate other instructions, micro-instructions, or control signals which reflect the original code instruction. The illustrated front end portion 43 also includes register renaming logic 46 and scheduling logic 48, which generally allocate resources and queue the operation corresponding to the convert instruction for execution.

The processor core 40 is shown including execution logic 50 having a set of execution units 55-1 through 55-N. Some embodiments can include a number of execution units dedicated to specific functions or sets of functions. Other embodiments can include only one execution unit or one execution unit that can perform a particular function. The illustrated execution logic 50 performs the operations specified by code instructions.

After completion of execution of the operations specified by the code instructions, back end logic 58 retires the instructions of code 42. In one embodiment, the processor core 40 allows out of order execution but requires in order retirement of instructions. Retirement logic 59 can take a variety of forms as known to those of skill in the art (e.g., re-order buffers or the like). In this manner, the processor core 40 is transformed during execution of the code 42, at least in terms of the output generated by the decoder, the hardware registers and tables utilized by the register renaming logic 46, and any registers (not shown) modified by the execution logic 50.

Although not illustrated in FIG. 10, a processing element can include other elements on chip with the processor core 40. For example, a processing element can include memory control logic along with the processor core 40. The processing element can include I/O control logic and/or can include I/O control logic integrated with memory control logic. The processing element can also include one or more caches.

Figure 11:
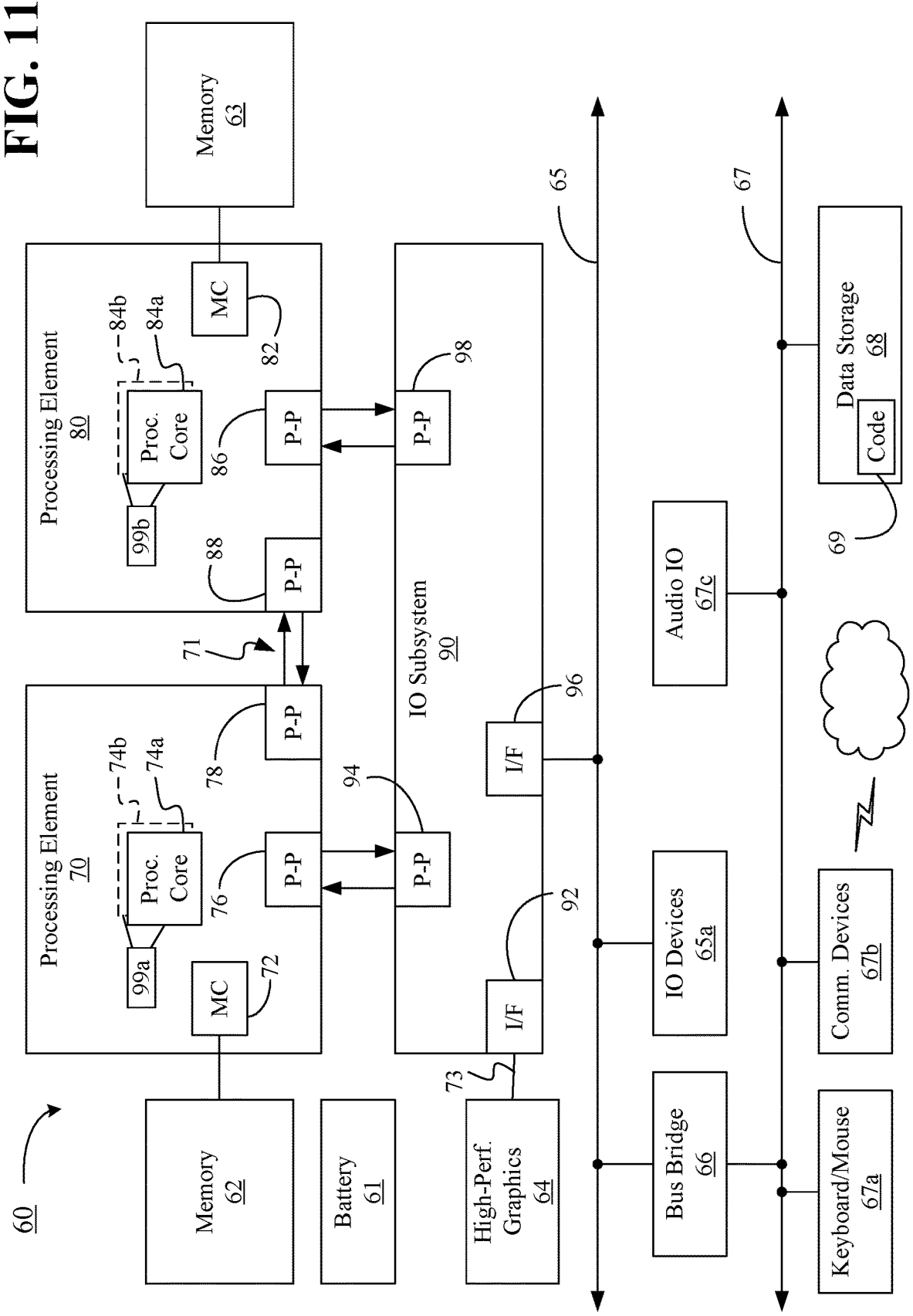
FIG. 11 is a block diagram illustrating an example of a multiprocessor-based computing system according to one or more embodiments.

FIG. 11 is a block diagram illustrating an example of a multi-processor based computing system 60 according to one or more embodiments, with reference to components and features described herein including but not limited to the figures and associated description. The multiprocessor system 60 includes a first processing element 70 and a second processing element 80. While two processing elements 70 and 80 are shown, it is to be understood that an embodiment of the system 60 can also include only one such processing element.

The system 60 is illustrated as a point-to-point interconnect system, wherein the first processing element 70 and the second processing element 80 are coupled via a point-to-point interconnect 71. It should be understood that any or all of the interconnects illustrated in FIG. 11 can be implemented as a multi-drop bus rather than point-to-point interconnect.

As shown in FIG. 11, each of the processing elements 70 and 80 can be multicore processors, including first and second processor cores (i.e., processor cores 74*a* and 74*b* and processor cores 84*a* and 84*b*). Such cores 74*a*, 74*b*, 84*a*, 84*b* can be configured to execute instruction code in a manner similar to that discussed above in connection with FIG. 10.

Each processing element 70, 80 can include at least one shared cache 99*a*, 99*b*. The shared cache 99*a*, 99*b* can store data (e.g., instructions) that are utilized by one or more components of the processor, such as the cores 74*a*, 74*b* and 84*a*, 84*b*, respectively. For example, the shared cache 99*a*, 99*b* can locally cache data stored in a memory 62, 63 for faster access by components of the processor. In one or more embodiments, the shared cache 99*a*, 99*b* can include one or more mid-level caches, such as level 2 (L2), level 3 (L3), level 4 (L4), or other levels of cache, a last level cache (LLC), and/or combinations thereof.

While shown with only two processing elements 70, 80, it is to be understood that the scope of the embodiments is not so limited. In other embodiments, one or more additional processing elements can be present in a given processor. Alternatively, one or more of the processing elements 70, 80 can be an element other than a processor, such as an accelerator or a field programmable gate array. For example, additional processing element(s) can include additional processors(s) that are the same as a first processor 70, additional processor(s) that are heterogeneous or asymmetric to processor a first processor 70, accelerators (such as, e.g., graphics accelerators or digital signal processing (DSP) units), field programmable gate arrays, or any other processing element. There can be a variety of differences between the processing elements 70, 80 in terms of a spectrum of metrics of merit including architectural, micro architectural, thermal, power consumption characteristics, and the like. These differences can effectively manifest themselves as asymmetry and heterogeneity amongst the processing elements 70, 80. For at least one embodiment, the various processing elements 70, 80 can reside in the same die package.

The first processing element 70 can further include memory controller logic (MC) 72 and point-to-point (P-P) interfaces 76 and 78. Similarly, the second processing element 80 can include a MC 82 and P-P interfaces 86 and 88. As shown in FIG. 11, MC's 72 and 82 couple the processors to respective memories, namely a memory 62 and a memory 63, which can be portions of main memory locally attached to the respective processors. While the MC 72 and 82 is illustrated as integrated into the processing elements 70, 80, for alternative embodiments the MC logic can be discrete logic outside the processing elements 70, 80 rather than integrated therein.

The first processing element 70 and the second processing element 80 can be coupled to an I/O subsystem 90 via P-P interconnects 76 and 86, respectively. As shown in FIG. 11, the I/O subsystem 90 includes P-P interfaces 94 and 98. Furthermore, the I/O subsystem 90 includes an interface 92 to couple I/O subsystem 90 with a high performance graphics engine 64. In one embodiment, a bus 73 can be used to couple the graphics engine 64 to the I/O subsystem 90. Alternately, a point-to-point interconnect can couple these components.

In turn, the I/O subsystem 90 can be coupled to a first bus 65 via an interface 96. In one embodiment, the first bus 65 can be a Peripheral Component Interconnect (PCI) bus, or a bus such as a PCI Express bus or another third generation I/O interconnect bus, although the scope of the embodiments are not so limited.

As shown in FIG. 11, various I/O devices 65*a* (e.g., biometric scanners, speakers, cameras, and/or sensors) can be coupled to the first bus 65, along with a bus bridge 66 which can couple the first bus 65 to a second bus 67. In one embodiment, the second bus 67 can be a low pin count (LPC) bus. Various devices can be coupled to the second bus 67 including, for example, a keyboard/mouse 67*a*, communication device(s) 67*b*, and a data storage unit 68 such as a disk drive or other mass storage device which can include code 69, in one embodiment. The illustrated code 69 can implement one or more aspects of the processes described above, including process 200, process 300, process 400, process 500, process 600, process 700, and/or process 740. The illustrated code 69 can be similar to the code 42 (FIG. 10), already discussed. Further, an audio I/O 67*c* can be coupled to second bus 67 and a battery 61 can supply power to the computing system 60. The system 60 can implement one or more aspects of system 100, pipeline 205, and/or cached stages 207 as described herein with reference to FIGS. 1 and 2.

Note that other embodiments are contemplated. For example, instead of the point-to-point architecture of FIG. 11, a system can implement a multi-drop bus or another such communication topology. Also, the elements of FIG. 11 can alternatively be partitioned using more or fewer integrated chips than shown in FIG. 11.

Embodiments of each of the above systems, devices, components and/or methods, including the system 10, the semiconductor apparatus 30, the processor core 40, the system 60, system 100, pipeline 205, cached stages 207, process 200, process 300, process 400, process 500, process 600, process 700, process 740, and/or any other system components, can be implemented in hardware, software, or any suitable combination thereof. For example, hardware implementations can include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of the foregoing systems and/or components and/or methods can be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components can be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages.

Additional Notes and Examples

Example 1 includes a computing system, comprising a processor, and a memory coupled to the processor to store instructions which, when executed by the processor, cause the processor to generate, via a model pipeline, a multi-level set of intermediate stages for a model, cache each of the set of intermediate stages, and responsive to a change in the model pipeline, regenerate an executable for the model using a first one of the cached intermediate stages to bypass regeneration of at least one of the intermediate stages.

Example 2 includes the system of Example 1, wherein the multi-level set of intermediate stages corresponds to a hierarchy of processing stages in the model pipeline, and wherein using the first one of the cached intermediate stages results in bypassing regeneration of a corresponding intermediate stage and of all intermediate stages preceding the corresponding intermediate stage in the hierarchy.

Example 3 includes the system of Example 2, wherein regenerating an executable for the model comprises regenerating one or more intermediate stages following the corresponding intermediate stage in the hierarchy.

Example 4 includes the system of Example 1, wherein a plurality of executable stages are cached, each executable stage corresponding to a different hardware device.

Example 5 includes the system of Example 1, wherein each of the intermediate stages are cached in a cache level based on a frequency of use of the respective intermediate stage.

Example 6 includes the system of any one of Examples 1-5, wherein the multi-level set of intermediate stages includes one or more of an inferred graph, an optimized graph, an intermediate representation, or an executable.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to generate, via a model pipeline, a multi-level set of intermediate stages for a model, cache each of the set of intermediate stages, and responsive to a change in the model pipeline, regenerate an executable for the model using a first one of the cached intermediate stages to bypass regeneration of at least one of the intermediate stages.

Example 8 includes the apparatus of Example 7, wherein the multi-level set of intermediate stages corresponds to a hierarchy of processing stages in the model pipeline, and wherein using the first one of the cached intermediate stages results in bypassing regeneration of a corresponding intermediate stage and of all intermediate stages preceding the corresponding intermediate stage in the hierarchy.

Example 9 includes the apparatus of Example 8, wherein regenerating an executable for the model comprises regenerating one or more intermediate stages following the corresponding intermediate stage in the hierarchy.

Example 10 includes the apparatus of Example 7, wherein a plurality of executable stages are cached, each executable stage corresponding to a different hardware device.

Example 11 includes the apparatus of Example 7, wherein each of the intermediate stages are cached in a cache level based on a frequency of use of the respective intermediate stage.

Example 12 includes the apparatus of any one of Examples 7-11, wherein the multi-level set of intermediate stages includes one or more of an inferred graph, an optimized graph, an intermediate representation, or an executable.

Example 13 includes the apparatus of Example 7, wherein the logic coupled to the one or more substrates includes transistor channel regions that are positioned within the one or more substrates.

Example 14 includes at least one non-transitory computer readable storage medium comprising a set of instructions which, when executed by a computing system, cause the computing system to generate, via a model pipeline, a multi-level set of intermediate stages for a model, cache each of the set of intermediate stages, and responsive to a change in the model pipeline, regenerate an executable for the model using a first one of the cached intermediate stages to bypass regeneration of at least one of the intermediate stages.

Example 15 includes the at least one non-transitory computer readable storage medium of Example 14, wherein the multi-level set of intermediate stages corresponds to a hierarchy of processing stages in the model pipeline, and wherein using the first one of the cached intermediate stages results in bypassing regeneration of a corresponding intermediate stage and of all intermediate stages preceding the corresponding intermediate stage in the hierarchy.

Example 16 includes the at least one non-transitory computer readable storage medium of Example 15, wherein regenerating an executable for the model comprises regenerating one or more intermediate stages following the corresponding intermediate stage in the hierarchy.

Example 17 includes the at least one non-transitory computer readable storage medium of Example 14, wherein a plurality of executable stages are cached, each executable stage corresponding to a different hardware device.

Example 18 includes the at least one non-transitory computer readable storage medium of Example 14, wherein each of the intermediate stages are cached in a cache level based on a frequency of use of the respective intermediate stage.

Example 19 includes the at least one non-transitory computer readable storage medium of any one of Examples 14-18, wherein the multi-level set of intermediate stages includes one or more of an inferred graph, an optimized graph, an intermediate representation, or an executable.

Example 20 includes a method comprising generating, via a model pipeline, a multi-level set of intermediate stages for a model, caching each of the set of intermediate stages, and responsive to a change in the model pipeline, regenerating an executable for the model using a first one of the cached intermediate stages to bypass regeneration of at least one of the intermediate stages.

Example 21 includes the method of Example 20, wherein the multi-level set of intermediate stages corresponds to a hierarchy of processing stages in the model pipeline, and wherein using the first one of the cached intermediate stages results in bypassing regeneration of a corresponding intermediate stage and of all intermediate stages preceding the corresponding intermediate stage in the hierarchy.

Example 22 includes the method of Example 21, wherein regenerating an executable for the model comprises regenerating one or more intermediate stages following the corresponding intermediate stage in the hierarchy.

Example 23 includes the method of Example 20, wherein a plurality of executable stages are cached, each executable stage corresponding to a different hardware device.

Example 24 includes the method of Example 20, wherein each of the intermediate stages are cached in a cache level based on a frequency of use of the respective intermediate stage.

Example 25 includes the method of any one of Examples 20-24, wherein the multi-level set of intermediate stages includes one or more of an inferred graph, an optimized graph, an intermediate representation, or an executable.

Example 26 includes an apparatus comprising means for performing the method of any one of Examples 20-24.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system, comprising:
   a processor; and
   a memory coupled to the processor to store instructions which, when executed by the processor, cause the processor to:
   generate, via a model generation pipeline, a multi-level set of intermediate stages for a model, wherein the model generation pipeline is to generate an executable for the model, and wherein the multi-level set of intermediate stages corresponds to a hierarchy of processing stages for generating the model in the model generation pipeline;
   cache each of the set of intermediate stages; and
   responsive to a change in one of the processing stages in the model generation pipeline, regenerate the executable for the model using a first one of the cached intermediate stages to bypass regeneration of at least one of the intermediate stages.

2. The system of claim 1, wherein using the first one of the cached intermediate stages results in bypassing regeneration of a corresponding intermediate stage and of all intermediate stages preceding the corresponding intermediate stage in the hierarchy.

3. The system of claim 2, wherein to regenerate the executable for the model comprises to regenerate one or more intermediate stages following the corresponding intermediate stage in the hierarchy.

4. The system of claim 1, wherein a plurality of executable stages are cached, each executable stage corresponding to a different hardware device.

5. The system of claim 1, wherein each of the intermediate stages are cached in a cache level based on a frequency of use of the respective intermediate stage.

6. The system of claim 1, wherein the multi-level set of intermediate stages includes one or more of an inferred graph, an optimized graph, or an intermediate representation.

7. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates to:

generate, via a model generation pipeline, a multi-level set of intermediate stages for a model, wherein the model generation pipeline is to generate an executable for the model, and wherein the multi-level set of intermediate stages corresponds to a hierarchy of processing stages for generating the model in the model generation pipeline;

cache each of the set of intermediate stages; and responsive to a change in one of the processing stages in the model generation pipeline, regenerate the executable for the model using a first one of the cached intermediate stages to bypass regeneration of at least one of the intermediate stages.

8. The apparatus of claim 7, wherein using the first one of the cached intermediate stages results in bypassing regeneration of a corresponding intermediate stage and of all intermediate stages preceding the corresponding intermediate stage in the hierarchy.

9. The apparatus of claim 8, wherein to regenerate the executable for the model comprises to regenerate one or more intermediate stages following the corresponding intermediate stage in the hierarchy.

10. The apparatus of claim 7, wherein a plurality of executable stages are cached, each executable stage corresponding to a different hardware device.

11. The apparatus of claim 7, wherein each of the intermediate stages are cached in a cache level based on a frequency of use of the respective intermediate stage.

12. The apparatus of claim 7, wherein the multi-level set of intermediate stages includes one or more of an inferred graph, an optimized graph, or an intermediate representation.

13. The apparatus of claim 7, wherein the logic coupled to the one or more substrates includes transistor channel regions that are positioned within the one or more substrates.

14. At least one non-transitory computer readable storage medium comprising a set of instructions which, when executed by a computing system, cause the computing system to:

generate, via a model generation pipeline, a multi-level set of intermediate stages for a model, wherein the model generation pipeline is to generate an executable for the model, and wherein the multi-level set of intermediate stages corresponds to a hierarchy of processing stages for generating the model in the model generation pipeline;

cache each of the set of intermediate stages; and responsive to a change in one of the processing stages in the model generation pipeline, regenerate the executable for the model using a first one of the cached intermediate stages to bypass regeneration of at least one of the intermediate stages.

15. The at least one non-transitory computer readable storage medium of claim 14, wherein using the first one of the cached intermediate stages results in bypassing regeneration of a corresponding intermediate stage and of all intermediate stages preceding the corresponding intermediate stage in the hierarchy.

16. The at least one non-transitory computer readable storage medium of claim 15, wherein to regenerate the executable for the model comprises to regenerate one or more intermediate stages following the corresponding intermediate stage in the hierarchy.

17. The at least one non-transitory computer readable storage medium of claim 14, wherein a plurality of executable stages are cached, each executable stage corresponding to a different hardware device.

18. The at least one non-transitory computer readable storage medium of claim 14, wherein each of the intermediate stages are cached in a cache level based on a frequency of use of the respective intermediate stage.

19. The at least one non-transitory computer readable storage medium of claim 14, wherein the multi-level set of intermediate stages includes one or more of an inferred graph, an optimized graph, or an intermediate representation.

20. A method comprising:

generating, via a model generation pipeline, a multi-level set of intermediate stages for a model, wherein the model generation pipeline generates an executable for the model, and wherein the multi-level set of intermediate stages corresponds to a hierarchy of processing stages for generating the model in the model generation pipeline;

caching each of the set of intermediate stages; and responsive to a change in one of the processing stages in the model generation pipeline, regenerating the executable for the model using a first one of the cached intermediate stages to bypass regeneration of at least one of the intermediate stages.

21. The method of claim 20, wherein using the first one of the cached intermediate stages results in bypassing regeneration of a corresponding intermediate stage and of all intermediate stages preceding the corresponding intermediate stage in the hierarchy.

22. The method of claim 21, wherein regenerating the executable for the model comprises regenerating one or more intermediate stages following the corresponding intermediate stage in the hierarchy.

23. The method of claim 20, wherein a plurality of executable stages are cached, each executable stage corresponding to a different hardware device.

24. The method of claim 20, wherein each of the intermediate stages are cached in a cache level based on a frequency of use of the respective intermediate stage.

25. The method of claim 20, wherein the multi-level set of intermediate stages includes one or more of an inferred graph, an optimized graph, or an intermediate representation.

* * * * *